United States Patent [19]
Endo et al.

[11] Patent Number: 6,018,298
[45] Date of Patent: Jan. 25, 2000

[54] ANTI-THEFT TAG

[75] Inventors: Takanori Endo; Masami Miyake, both of Omiya; Seiro Yahata, Tokyo, all of Japan

[73] Assignee: Mitsubishi Materials Corporation, Tokyo, Japan

[21] Appl. No.: 09/208,856

[22] Filed: Dec. 10, 1998

Related U.S. Application Data

[62] Division of application No. 08/925,162, Sep. 8, 1997, Pat. No. 5,912,622.

[30] Foreign Application Priority Data

| | | | |
|---|---|---|---|
| Nov. 29, 1996 | [JP] | Japan | 8-319607 |
| Nov. 29, 1996 | [JP] | Japan | 8-319608 |
| Jan. 10, 1997 | [JP] | Japan | 9-002825 |

[51] Int. Cl.[7] ................................................ G08B 13/14
[52] U.S. Cl. ..................................... 340/572.5; 343/841
[58] Field of Search ........................... 340/572.5; 361/816, 361/818; 343/841, 842

[56] References Cited

U.S. PATENT DOCUMENTS

| | | | |
|---|---|---|---|
| 4,745,401 | 5/1988 | Montean | 340/572.3 |
| 5,039,996 | 8/1991 | Fockens | 343/866 |
| 5,430,441 | 7/1995 | Bickley et al. | 340/572.7 X |
| 5,576,622 | 11/1996 | Morrone et al. | 324/318 |

*Primary Examiner*—Thomas Mullen
*Attorney, Agent, or Firm*—Oblon, Spivak, McClelland, Maier & Neustadt, P.C.

[57] ABSTRACT

An anti-theft tag for attachment to a theft-monitored article including a resonance circuit which resonates radio waves of a predetermined frequency transmitted from an antenna, and a shielding coil having at least two terminals. The shielding coil is disposed between the resonance circuit and the article when the anti-theft tag is attached to the article, and the at least two terminals are short-circuited.

4 Claims, 10 Drawing Sheets

ANTI-THEFT TAG

CROSS-REFERENCE TO RELATED APPLICATIONS

This application is a divisional application of parent application Ser. No. 08/925,162 filed on Sep. 8, 1997, now U.S. Pat. No. 5,912,622.

BACKGROUND OF THE INVENTION

1. Field of the Invention

The present invention relates to an anti-theft tag which when attached to an article notifies a security system if the article is taken without permission. More specifically, the present invention is related to an improved tag which will properly notify the security system even if the tag is attached to an article having a conductive surface.

2. Discussion of the Background

A background burglar-proof tag is disclosed in Japanese Patent Laid-Open No. 8-185,584 in which a resonance circuit of the tag attached to a theft-monitored article resonates radio waves of a predetermined frequency from a radio wave transmitter. In addition, the anti-theft tag includes a detachment-detecting mechanism which detects whether or not the tag is detached from the theft-monitored article, and a detachment-informing section which controls an audible output device based on the output detected by the detachment-detecting device. The resonance circuit of the background anti-theft tag is made of conductive metal foils which have a predetermined shape formed by etching or the like on both faces of an insulating dielectric thin film. For example, a spiral induction circuit of a conductive metal foil having a right-side planar pattern of a capacitor circuit connected to the center of the spiral induction circuit is formed on the thin film surface. The detachment-detecting device has a protruding operation bar which is placed on the attaching face of the tag and acts as a detecting switch which detects if the tag has been detached from the article. The detecting switch is electrically connected to a power source and a buzzer. The detachment-informing section includes a circuit composed of the detecting switch, the power source and the buzzer. When the tag is attached to an article, the operation bar is forced into the detachment-detecting device by way of the article and the detecting switch is turned off. When the tag is detached from the article, the operation bar protrudes and the detecting switch is turned on.

An interrogator antenna and a transponder antenna are placed apart from each other at a predetermined distance at a gateway of a store. In addition, the interrogator and transponder antennas are electrically connected to a control section. The control section transmits radio waves at a given frequency via the interrogator antenna which resonate in the resonance circuit of the anti-theft tag. Further, the control section continuously monitors received signal levels via the transponder antenna. Further the control section connects to a speaker for generating an alarm.

When an article with the anti-theft tag passes between the interrogator and transponder antennas, radio waves from the interrogator antenna resonate in the resonance circuit of the tag attached to the theft-monitored article and the transponder antenna receives a signal with a modulated level. The control section then generates an alarm using the speaker to provide notice that the article has been taken without permission. When the tag is detached from the article, the operation bar protrudes, the detecting switch is turned on, and the buzzer sounds. Thus, theft can be surely monitored.

However, when such a background tag is attached to an article which has a surface made with a conductive material (e.g., aluminum or a ferromagnetic material), the self-inductance of the resonance circuit changes, resulting in a different resonance frequency for an article having a surface formed with an insulating or nonmagnetic material. Thus, such an anti-theft tag is not suitable for articles having conductive or ferromagnetic materials.

SUMMARY OF THE INVENTION

Accordingly, one object of the present invention is to provide an anti-theft tag in which the resonance frequency of the resonance circuit is substantially the same regardless of the material used for the surface of the article to which the anti-theft tag is attached or when the resonance frequency is high.

Another object of the present invention to provide an anti-theft tag which decreases the loss resistance component of the resonance circuit, increases the Q value, and enables sharp resonance by narrowing the resonance frequency width of the resonance circuit when the resonance frequency is high.

In a first aspect of the present invention, when the anti-theft tag is attached to an article whose surface is made with a conductive material (e.g., aluminum or a ferroelectric material) such as a steel sheet, a resonance circuit included in the anti-theft tag is electromagnetically shielded from the article by way of a soft magnetic layer, disposed therebetween. Thus, the self-inductance of the resonance circuit is minimized compared to a case of the tag being attached to an article whose surface is formed of an insulating or nonmagnetic material.

In a second aspect of the present invention the anti-theft tag includes at least one slit in the soft magnetic layer to shield eddy currents, which occur in the soft magnetic layer even when the resonance frequency is high and the self-inductance of the resonance circuit does not substantially change, as in the above-mentioned aspect.

A third aspect of the present invention relates to the first aspect of the invention, with an addition that the soft magnetic layer may include a composite material of flakes of the soft magnetic material and a plastic material. Therefore, eddy currents which occur in the soft magnetic layer can be suppressed even when the radio wave frequency transmitted from the interrogator antenna is high and the self-inductance of the resonance circuit does not substantially change.

A fourth aspect of the present invention relates to the invention described in any one of first to third aspects, in which the soft magnetic material forming the soft magnetic layer is any one of an amorphous alloy, a highly magnetic permeable iron-base alloy sold under the trademark PERMALLOY, an electromagnetic soft iron, a silicon steel sheet, a sendust alloy, a Fe—Al alloy, and a soft magnetic ferrite.

Examples of the amorphous alloys which may be used include materials with a high magnetic permeability, such as cobalt-based alloys, iron-based alloys and nickel-based alloys. In general, amorphous alloys contain 70 to 98 percent by weight of Co, Fe and Ni in total, 2 to 30 percent by weight of B, Si and P in total, and other components such as Al, Mn, Zr, Nb and the like.

Examples of cobalt-based alloys which may be used include: an alloy having 84 percent by weight of Co, 5.3 percent by weight of Fe, 8.5 percent by weight of Si and 2.2 percent by weight of B; an alloy including 84 percent by weight of Co, 3.3 percent by weight of Fe, 1.3 percent by weight of B, 9.8 percent by weight of P and 1.6 percent by weight of Al; an alloy including 89 percent by weight of Co, 5.3 percent by weight of Fe, 2.3 percent by weight of Si and 3.4 percent by weight of B; an alloy including 81.9 percent by weight of Co, 5.1 percent by weight of Fe, 10 percent by weight of Si and 3 percent by weight of B; an alloy including 80 percent by weight of Co, 10 percent by weight of Fe, 6 percent by weight of Si and 4 percent by weight of B; and an alloy including 78.8 percent by weight of Co, 5.1 percent by weight of Fe, 6.1 percent by weight of Si, 4.7 percent by weight of B and 5.3 percent by weight of Ni.

Examples of iron-based alloys which may be used include an alloy having 95.4 percent by weight of Fe and 4.6 percent by weight of B; and an alloy having 91.4 percent by weight of Fe, 5.9 percent by weight of Si and 2.7 percent by weight of B.

A typical example of a nickel-based alloy includes 94.5 percent by weight of Ni and 5.5 percent by weight of P.

Examples of a PERMALLOY which may be used include 78-Permalloy, 45-Permalloy, Hipernik, Monimax, Sinimax, Radiometal, 1040 Alloy, Mumetal, Cr-Permalloy, Mo-Permalloy, Supermalloy, Hardperm, 36-Permalloy, Deltamax, prismatic hysteresis permalloy, JIS PB TYPE 1 and TYPE 2, JIS PC TYPES 1–3, JIS PD TYPE 1 and TYPE 2, and JIS PE TYPE 1 and TYPE 2.

Examples of electromagnetic soft irons which may be used include industrial pure iron, Armco iron, Cioffi pure iron and low carbon steel sheet.

Examples of usable silicon steel sheets include non-oriented silicon steel sheets and oriented silicon steel sheets.

Examples of usable sendust alloys and Fe—Al alloys include alperm, Hypermal 12% Al—Fe), sendust and super-sendust.

Examples of usable soft magnetic ferrite alloys include Mn—Mg type, Mn—Zn type and Ni—Zn type alloys having low magnetic flux densities, and Mn—Zn type alloys having high magnetic flux densities.

In a fourth aspect of the present invention when the soft magnetic layer is made with the soft magnetic materials discussed above, the resonance circuit can be electromagnetically shielded from an article having a surface made of a conductive or ferromagnetic material. This can be surely achieved due to a high magnetic permeability of 1,000 or more, a small coercive force of 100 A/m or less and a small hysteresis loss.

A fifth aspect of the present invention is characterized in that a planar shielding coil, of which both terminals are short-circuited, is disposed between an attaching face of the theft-monitored article and the resonance circuit. When the resonance circuit is attached to the article of which the surface is formed of a conductive material with the shielding coil therebetween, a reverse induced current flows in the shielding coil when the resonance circuit resonates. A magnetic field which occurs on the surface of the article created by the resonance of the resonance circuit is offset by a magnetic field which occurs due to the induced current flowing in the shielding coil. As a result, no eddy currents occur on the surface of the article, and the resonance circuit has substantially the same self-inductance as when the tag is attached to an article having an insulating or nonmagnetic surface.

A sixth aspect of the present invention relates to the fifth aspect of the invention, in which the shielding coil has a size the same as or larger than a resonance coil in the resonance circuit. In this case, the resonance coil is completely shielded by way of the shielding coil, preventing eddy currents from occurring on the article when the resonance coil resonates and the self-inductance of the resonance circuit does not substantially change.

A seventh aspect of the present invention relates to the invention in either the fifth or sixth aspect, in which each wire segment or each ring section of the shielding coil is provided between two adjacent wire segments of the resonance coil when a laminate of the resonance circuit and the shielding coil is projected from the top or bottom face. In this case, the distributed capacitance between the resonance coil and the shielding coil decreases, and thus eddy currents occurring on the surface of the article can be decreased. As a result, the loss resistance component of the resonance circuit can be decreased. Thus, the Q value increases and the resonance circuit has a sharp resonance. Even when the resonance frequency is high, the loss resistance component of the resonance circuit, such as hysteresis loss, can be decreased and the Q value can be increased.

An eighth aspect of the present invention relates to the invention described in any one of fifth, sixth, and seventh aspects, in which a non-conductive nonmagnetic coil insulating layer having a thickness of 5 mm or less is disposed between the shielding coil and the resonance coil. The coil insulating layer can decrease the distributed capacitance between the resonance coil and the shielding coil. Thus, eddy currents occurring on the surface of the article further decrease, the Q value further increases, and the resonance circuit has a sharper resonance.

DESCRIPTION OF THE PREFERRED EMBODIMENTS

Figure 1:
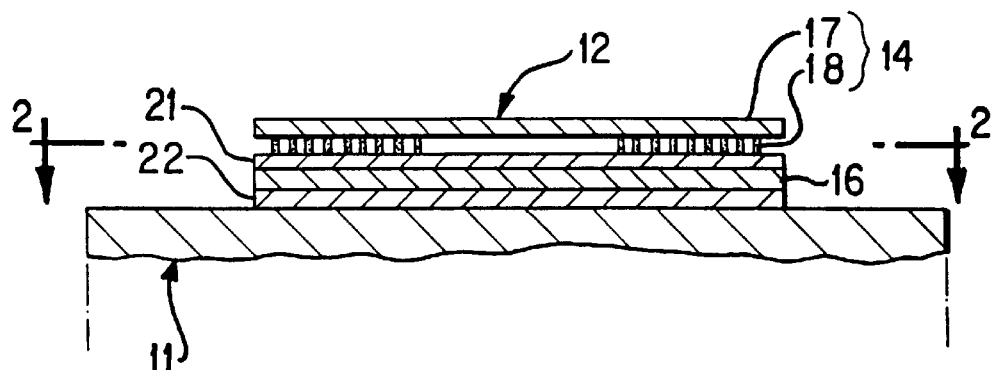
FIG. 1 is a cross-sectional view of line A—A in FIG. 2 of an anti-theft tag according to a first embodiment of the present invention.

Referring now to the drawings, wherein like reference numerals designate identical or corresponding parts throughout the several views. A first embodiment of the present invention will now be described with reference to FIGS. 1–3.

First Embodiment

Figure 2:
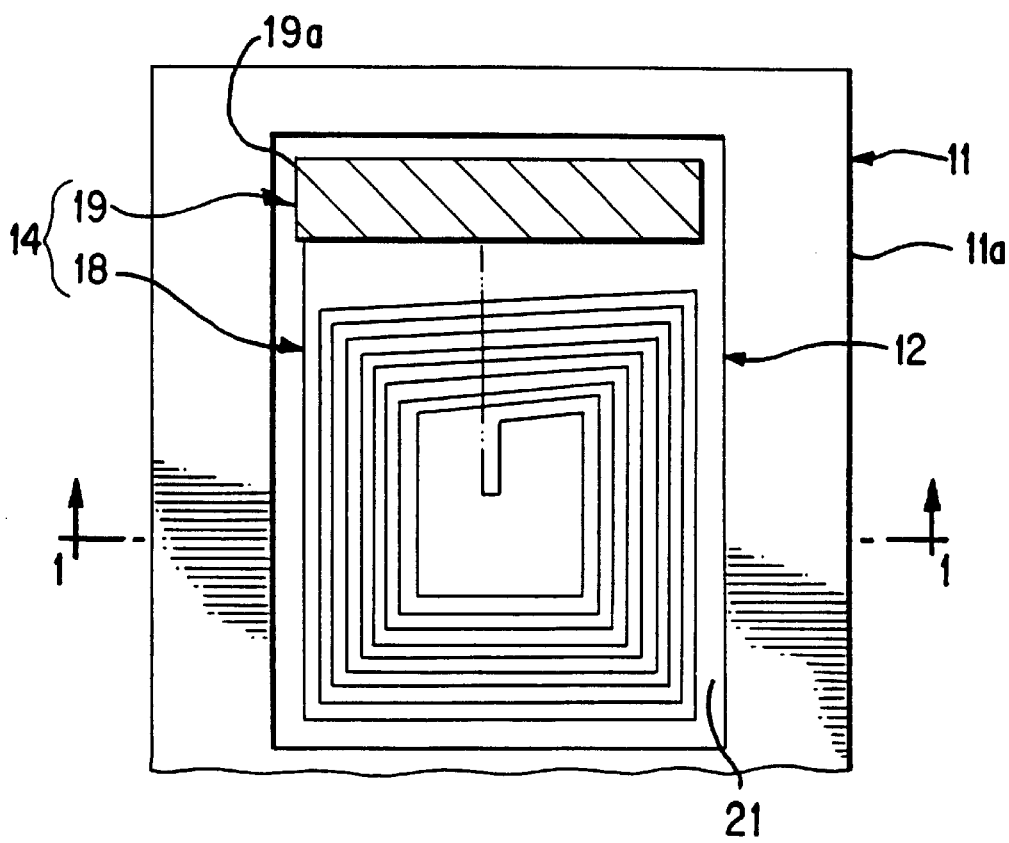
FIG. 2 is a cross-sectional view of line B—B in FIG. 1.
Figure 3:
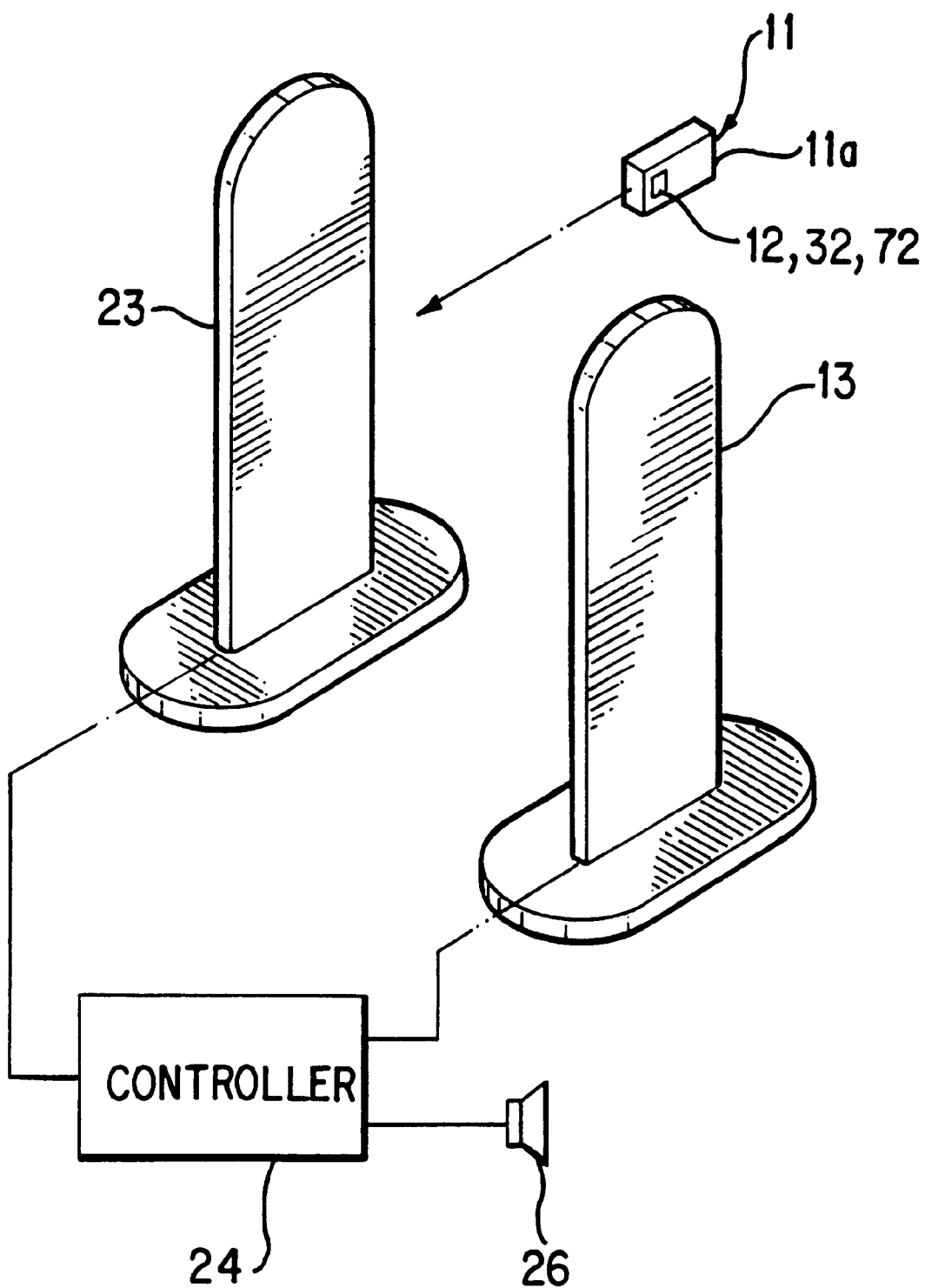
FIG. 3 is a perspective view illustrating a state in which an article with an anti-theft tag is passed between an interrogator antenna and a transponder antenna.

FIGS. 1 and 2 illustrate a tag 12 attached to a theft-monitored article 11, in which the tag 12 includes a resonance circuit 14 for resonating radio waves of a specific frequency transmitted from an interrogator antenna 13 shown in FIG. 3. Further, the tag 12 includes a soft magnetic layer 16 which is disposed between the attaching surface of the article 11 and the resonance circuit 14. The article 11 in this embodiment is, for example, a ferromagnetic container 11a, made of a steel sheet which contains drinking water, candy or the like. The resonance circuit 14 includes a baseboard 17 formed of an insulation material such as paper or thin plastic (not shown), a spirally rectangular conductive coil 18 is made of, for example, copper or aluminum and formed on a side of the baseboard 17, and a capacitor 19 which is bonded to the same side of the base board 17 and is electrically connected to the coil 18. The capacitor 19 includes a pair of electrode layers 19a which are bonded to each other through a dielectric layer (not shown). The coil 18 is provided by coiling and bonding an insulation wire to the baseboard 17 so as to form a rectangular spiral, or by etching or stamping a conductive material, such as aluminum or copper foil, so as to remove unnecessary sections and to form a rectangular spiral.

The soft magnetic layer 16 may be formed by any soft magnetic material such as an amorphous alloy, PERMALLOY, electromagnetic soft iron, silicon steel sheet, sendust alloy, Fe—Al alloy, and a soft magnetic ferrite. The soft magnetic layer 16 is a plane having substantially the same area as that of the baseboard 17, and is bonded with a bonding agent 21 to a surface of the baseboard 17 having the coil 18 and the capacitor 19. The soft magnetic layer 16 bonded to the baseboard 17 is fixed on the surface of the article 11 (i.e., the steel container 11a) with a bonding agent 22. As shown in FIG. 3, an interrogator antenna 13 and a transponder antenna 23 are positioned at a predetermined distance at a gateway (not shown) of a store which sells the articles 11. The transponder antenna 23 is connected to an input section of a controller 24 and the interrogator antenna 13 is connected to an output section of the controller 24. A speaker 26, which is used to sound an alarm if necessary, is connected to the output section of the controller 24.

The controller 24 controls the interrogator antenna 13 to transmit radio waves at a given frequency which resonate in the resonance circuit 14 and continually monitors signal levels received by the transponder antenna 23. When the transponder antenna 23 directly receives radio waves (i.e., without interference from the resonating circuit) from the interrogator antenna 13 the signal level is set to a standard value. When the transponder antenna 23 receives radio waves which were transmitted from the interrogator antenna 13 and resonated in the resonance circuit 14 of the tag 12, the signal level is greater than the standard value by a predetermined value. The controller 24 can then generate an alarm via the speaker 26 in response to such a difference in signal level.

An operation of the anti-theft tag having the configuration described above will now be explained.

When the article 11 with the anti-theft tag 12 is illegally passed between the interrogator antenna 13 and the transponder antenna 23, the resonance circuit 14 of the tag 12 resonates in response to the radio waves transmitted from the interrogator antenna 13. The self-inductance of the resonance circuit 14 does not substantially change because the resonance circuit 14 is electromagnetically shielded from the steel sheet container 11a of the article 11 by the soft magnetic layer 16. As a result, the resonance circuit 14 emits radio waves with a frequency which is determined by the self-inductance of the coil 18 and the capacitance of the capacitor 19. When the transponder antenna 23 receives these radio waves, the controller 24 detects that the article 11 has been taken illegally and generates an alarm via the speaker 26.

On the other hand, when the article 11 is brought to a checkout counter (not shown) for payment, the capacitor 19 of the resonance circuit 14 is broken by, for example, emitting strong radio waves to the tag 12. As a result, the resonance circuit 14 does not resonate and the controller 24 does not sound an alarm when the article 11 is passed between the interrogator antenna 13 and the transponder antenna 23.

In this embodiment, the article 11 having a ferromagnetic steel sheet container containing drinking water, or candy is illustrated as an example only, and a conductive aluminum container containing drinking water and articles made of insulating, nonmagnetic or any other materials can also be applied. If an article is a book, the tag 12 may be attached to a sales card (not shown). Since the sales card with the tag 12 is removed at the store counter (not shown) when it is purchased, the controller does not sound an alarm when the book is passed between the interrogator antenna 13 and transponder antenna 23.

In addition, the coil 18 may be formed into a spiral of circular or any other shape instead of the rectangular spiral discussed previously.

Further, the soft magnetic layer 16 may be fixed on the surface of the article 11 with an adhesive tape (not shown) having adhesive layers on both sides instead of the bonding agent 22 discussed above.

Still further, a thickness of the soft magnetic layer 16 is not limited as long as it exhibits electromagnetic shielding effects, and is preferably in a range from 5 $\mu$m to 500 $\mu$m in view of practical use. In addition, the soft magnetic layer 16 may be formed of a composite material composed of flakes of the soft magnetic material and a plastic material. It is preferable that the thickness of each flake of the soft magnetic material be 20 $\mu$m or less. In addition, it is preferable that the plastic material has an insulating property. Examples of preferable plastic materials include acrylic resins, polyester resins, polyvinyl chloride, polyethylene, polystyrene and epoxy resins.

Second Embodiment

A second embodiment of the present invention will be described with reference to FIGS. 4–7.

Figure 4:
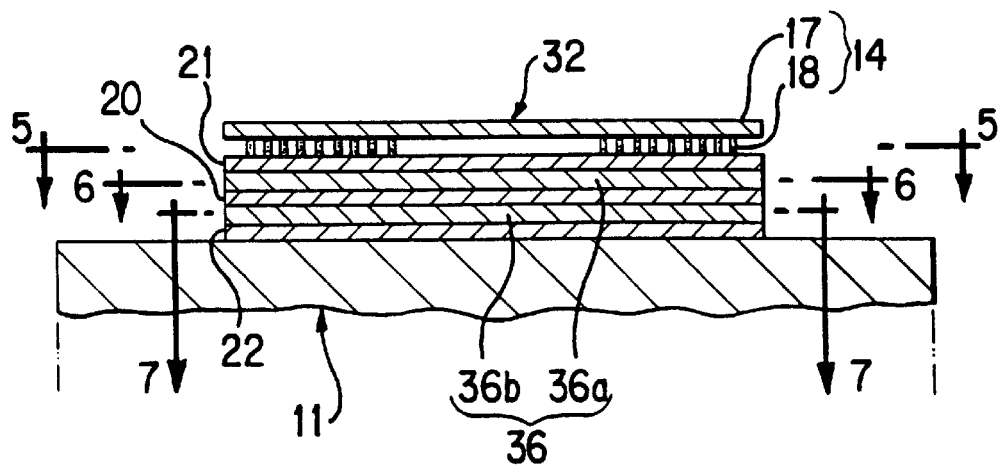
FIG. 4 is a cross-sectional view of line C—C of an anti-theft tag according to a second embodiment of the present invention.

As shown in FIG. 4, this embodiment has a similar configuration to that described in the first embodiment except that the tag 32 includes a soft magnetic layer 36 having a first layer 36a and a second layer 36b disposed between the attaching face of the article 11 and the resonance circuit 14. The first layer 36a and second layer 36b are laminated through a bonding layer 20 which is formed by a bonding agent applied to both surfaces of the insulating film. Therefore, the first layer 36a and the second layer 36b are mutually insulated from electrical connection, which prevents eddy current leakage from one layer to another layer, i.e., from the first layer 36a to the second layer 36b, or from the second layer 36b to the first layer 36a. In addition, the first layer 36a is provided with a plurality of first slits 36c (shown in FIG. 6) which vertically extend to both peripheries at a given distance except for a horizontally-extending central section 36e. The second layer 36b (shown in FIG. 7) is provided with a plurality of second slits 36d which horizontally extend to both peripheries at a given distance except for the vertically-extending central section 36f.

Figure 9:
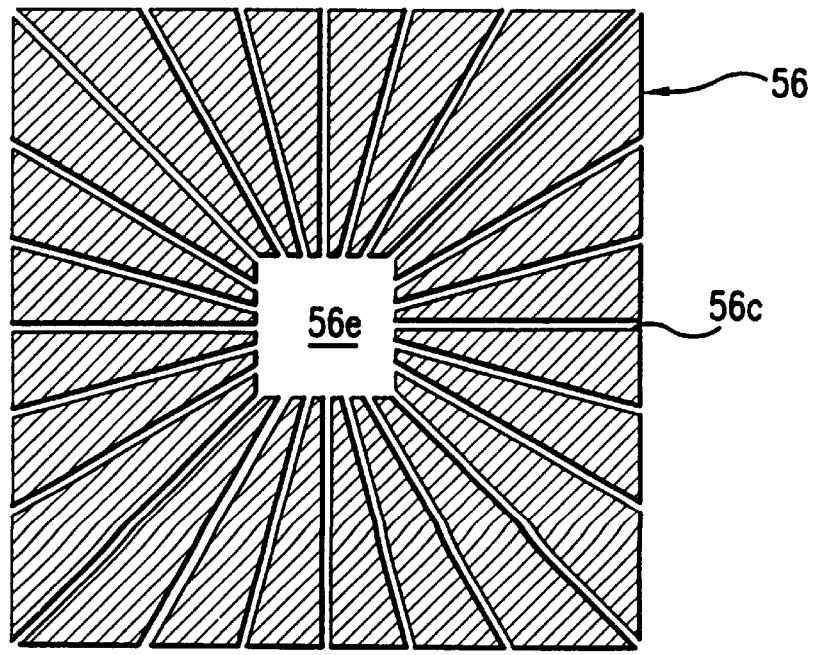
FIG. 9 is a cross-sectional view, corresponding to FIG. 6, according to a fourth embodiment of the present invention.

The slits 36c and 36d are formed by, for example, an etching process, a stamping process, an electron beam process, or a laser cutting process. The first layer 36a and the second layer 36b are laminated so that the slits 36c and slits 36d are perpendicular to each other. The occurrence of eddy currents can be most effectively prevented when the direction of the slits 36c or slits 36d are perpendicular to the coil 18, whereas it is more difficult to prevent when the direction is parallel to the coil 18. Thus, this configuration between the slits 36c and slits 36d can effectively prevent occurrence of eddy currents independent of the direction relative to the coil 18. When the prevention of eddy currents is performed by using only a soft magnetic layer, it is preferable that the slits be radially formed, as shown in FIG. 9, and discussed in the fourth embodiment below.

In addition, discharge does not occur in the slits 36c and 36d even when the widths of the slits 36c and 36d are narrowed, because the voltage of eddy currents occurring in layers 36a and 36b is significantly low. Increased widths of the slits 36c and 36d deteriorate the electromagnetic shielding effect due to a decreased volume of the soft magnetic layer 36. Thus, it is preferable that the widths of the slits 36c and 36d be minimized in view of performance. However, the widths of the slits 36c and 36d are limited by a forming process. In an etching process, the widths of the slits 36c and 36d range from 0.05 mm to 1 mm, and are preferably 0.05 mm to 0.2 mm. In a stamping process, the widths of the slits 36c and 36d range from 0.1 mm to 2 mm, and are preferably 0.1 mm to 0.2 mm. In an electron beam process, the widths of the slits 36c and 36d range from 1 $\mu$m to 100 $\mu$m, and are preferably 1 $\mu$m to 10 $\mu$m. Further, eddy currents can be reduced as the widths of the first and second layers 36a and 36b, which are divided by way of a plurality of slits 36c and 36d, narrows. However, the total volume of the first layer 36a or the second layer 36b decreases by a volume which corresponds to the volume of a single slit 36c or 36d multiplied by the number of the slits 36c or 36d. Thus, the electromagnetic shielding effects due to layers 36a and 36b decrease. Therefore, the number of the slits 36c and 36d ranges from 1 to 100 /cm and are preferably 5 to 30 /cm.

Figure 5:
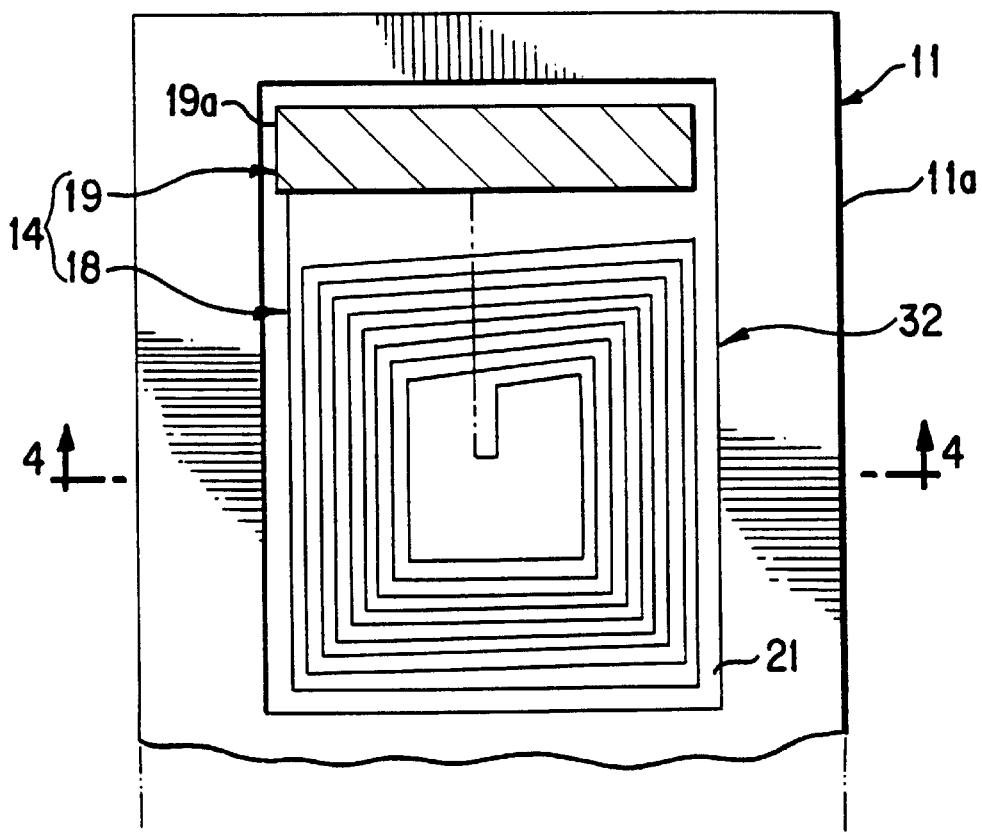
FIG. 5 is a cross-sectional view of line D—D in FIG. 4.
Figure 6:
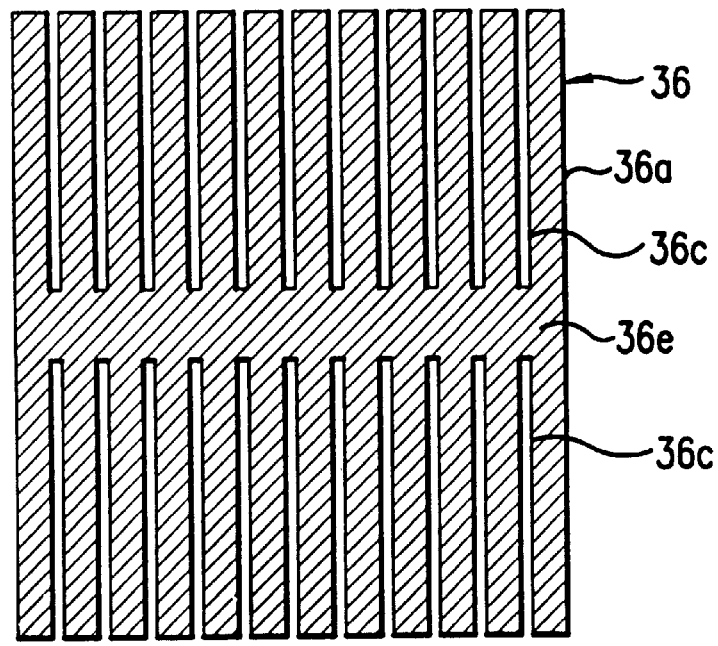
FIG. 6 is a cross-sectional view of line E—E in FIG. 4.
Figure 7:
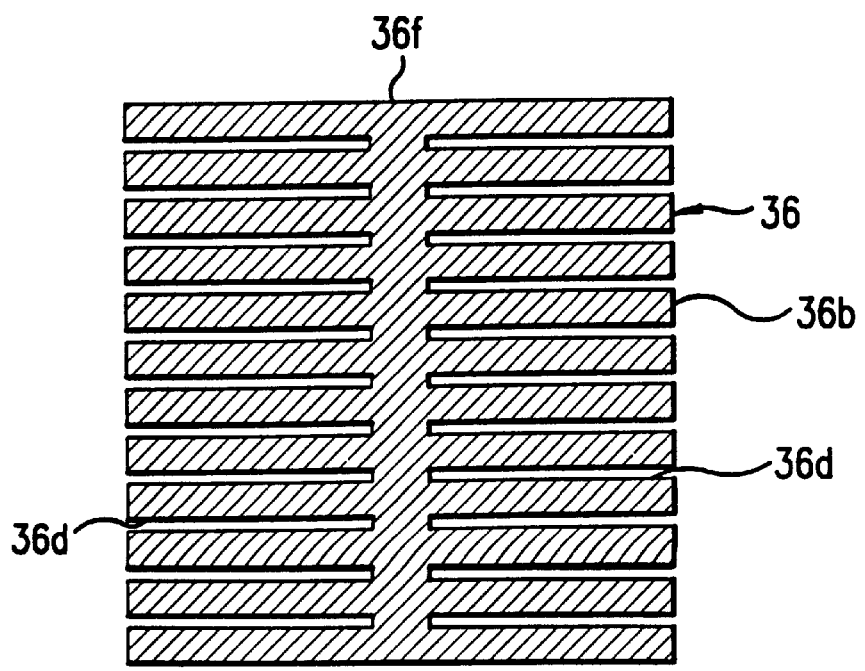
FIG. 7 is a cross-sectional view of line F—F in FIG. 4.

The first and second layers 36a and 36b are formed of any one of the soft magnetic materials of an amorphous alloy, PERMALLOY, electromagnetic soft iron, silicon steel sheet, sendust alloy, FeAl alloy, and soft magnetic ferrite. The first and second layers 36a and 36b are bonded to each other forming the planar soft magnetic layer 36, with substantially the same area as the base board 17. The soft magnetic layer 36 is bonded to the same side of the base board 17 with an adhesive agent 21 on which the coil 18 and capacitor 19 are provided. The soft magnetic layer 36 bonded to the base board 17 is attached to the surface of the article 11, i.e., the surface of the steel sheet container 11a with a bonding agent 22 (FIGS. 4 and 5).

The operation of the burglar proof tag having the configuration described above will now be explained. Similar to that for the first embodiment and in reference to FIG. 3, when the article 11 with the attached burglar-proof tag 32 is illegally passed between the interrogator antenna 13 and the transponder antenna 23, the resonance circuit 14 of the tag 32 resonates in response to the radio waves transmitted from the interrogator antenna 13, as in the first embodiment described above. The self-inductance of the resonance circuit 14 does not substantially change because the resonance circuit 14 is electromagnetically shielded from the steel sheet container 11a of the article 11 due to the soft magnetic layer 36. Also, the self-inductance of the resonance circuit 14 does not substantially change when the frequency of radio waves transmitted from the interrogator antenna is high, or when the resonance frequency of the resonance circuit 14 is high, because the first and second slits 36c and 36d are perpendicular to each other and thus prevent eddy currents which occur concentrically on the first and second layers 36a and 36b. As a result, the resonance circuit 14 emits radio waves with a frequency which is determined by the self-inductance of the coil 18 and the capacitance of the capacitor 19. When the transponder antenna receives these radio waves, the controller detects that the article 11 has been taken illegally and generates an alarm via the speaker 26.

On the other hand, when the article 11 is brought to a checkout counter (not shown) for payment, the capacitor 19 of the resonance circuit 14 is broken by, for example, emitting strong radio waves to the tag 32. As a result, the resonance circuit 14 does not resonate and the controller does not generate an alarm when the article 11 is passed between the interrogator antenna 13 and the transponder antenna 23.

Although two soft magnetic layers, i.e., the first and second layers 36a and 36b, are provided in this embodiment, three or more soft magnetic layers may be provided. In this case, it is preferable that the individual soft magnetic layers be provided with slits which are at a predetermined angle to each other.

Third Embodiment

Figure 8:
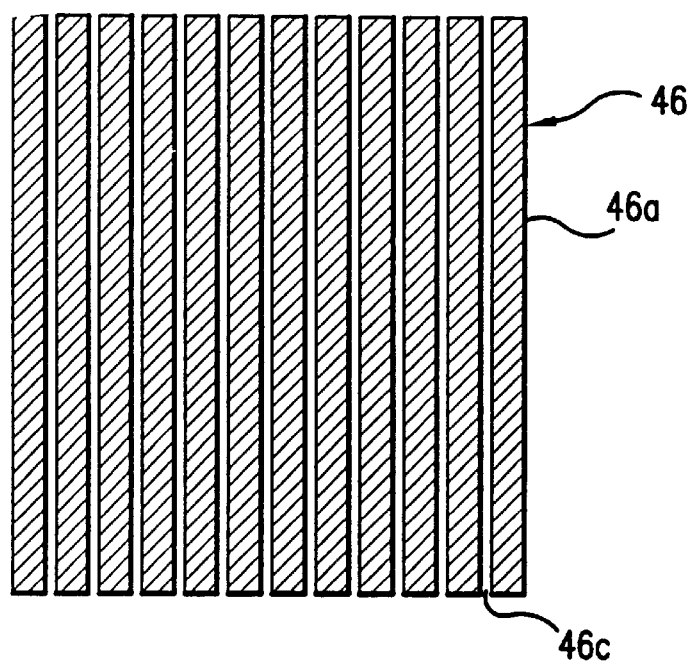
FIG. 8 is a cross-sectional view, corresponding to FIG. 6, according to a third embodiment of the present invention.

FIG. 8 shows a third embodiment of the present invention.

This embodiment has a similar configuration as the first embodiment except that a first layer 46a and a second layer (not shown) of the soft magnetic layer 46 are provided with a plurality of first slits 46c and a plurality of second slits (not shown) which are placed in parallel at a given distance so as to divide the first layer 46a and the second layer into a plurality of rectangles. The first slits 46c and the second slits are formed on the first layer 46a and the second layer by, for example, etching of a soft magnetic foil bonded to an insulating film.

The operation of the burglar proof tag having such a configuration is substantially the same as that of the first embodiment and therefore, detailed illustration will be omitted.

Fourth Embodiment

FIG. 9 illustrates a fourth embodiment of the present invention.

In this embodiment, a plurality of slits 56c are radially formed from the non-slit section 56e in the center of the soft magnetic layer 56. These slits 56c are formed by, for example, etching, stamping, electron-beam scanning, laser cutting or the like.

Since the number of the slits 56c is restricted with an anti-theft tag having this configuration, prevention of eddy currents is less efficient than the soft magnetic layer used in second embodiment. However, since the slits 56c do not have magnetic anisotropy, eddy currents can be prevented by a single soft magnetic layer 56 and the directions of the slits 56c are not restricted when using a plurality of soft magnetic layers 56. Since the operation is almost the same as the second embodiment, a detailed description will be omitted.

Fifth Embodiment

Figure 10:
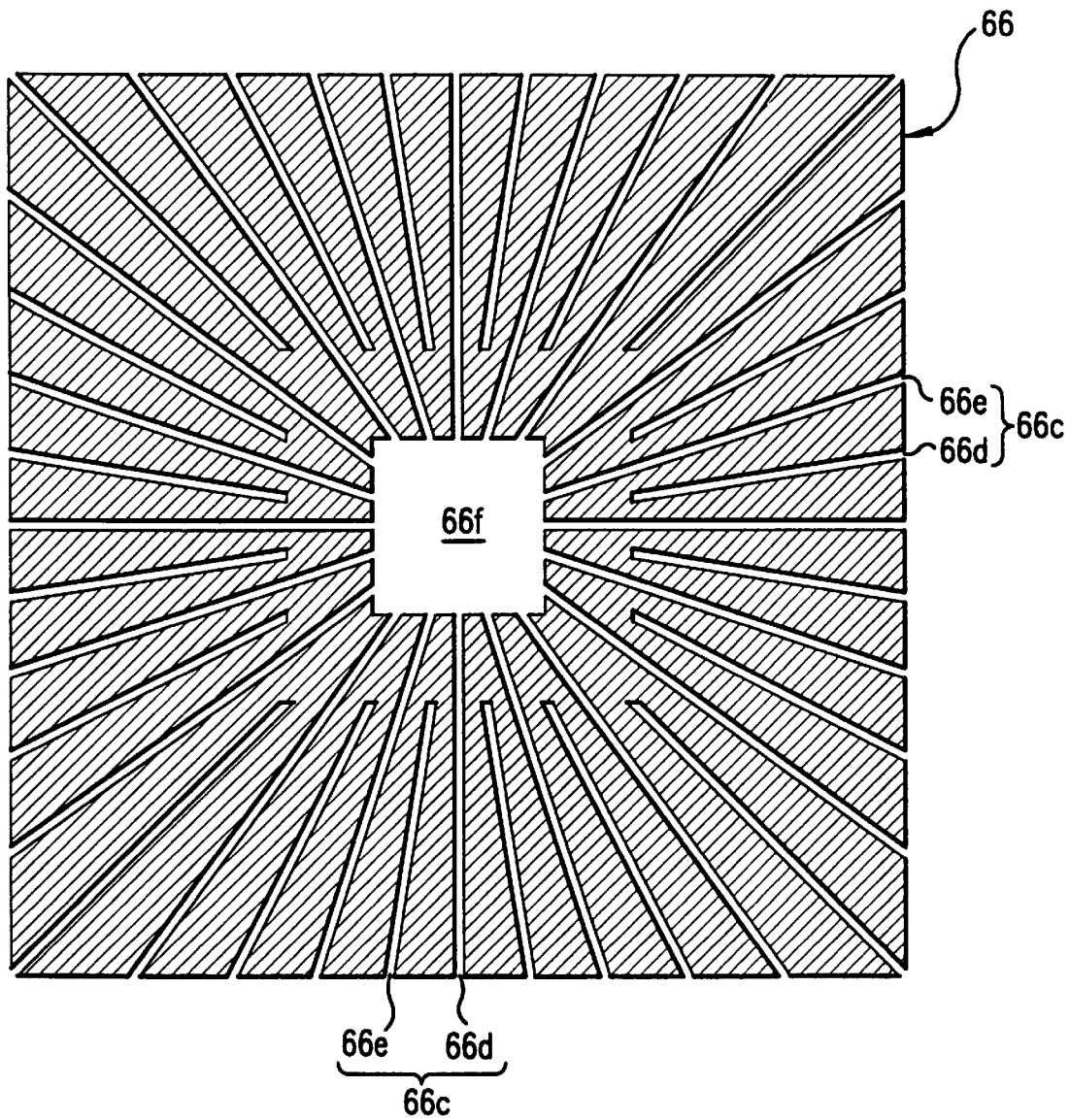
FIG. 10 is a cross-sectional view, corresponding to FIG. 6, according to a fifth embodiment of the present invention.

FIG. 10 shows a fifth embodiment of the present invention.

In this embodiment, a plurality of slits 66c in the soft magnetic layer 66 include long slits 66d which are radially formed from the central non-slit section 66f, and short slits 66e which are radially formed between the long slits 66d. The long slits 66d extend from the central non-slit section 66f to the outer periphery of the soft magnetic layer 66 as in the fourth embodiment described above. The short slits 66e are provided between the long slits 66d in which the outer end of each short slit 66e extends to the outer periphery of the soft magnetic layer 66 but its inner end does not reach the central non-slit section 66f.

In the anti-theft tag having the above-mentioned configuration, since the slits 66e do not show directivity and magnetic anisotropy, eddy currents can be prevent by a single soft magnetic layer 66, and the short slits 66e formed between the long slits 66d decrease intervals between slits and more effectively prevent eddy currents from occurring.

Sixth Embodiment

FIGS. 11 to 15 show a sixth embodiment of the present invention.

Figure 11:
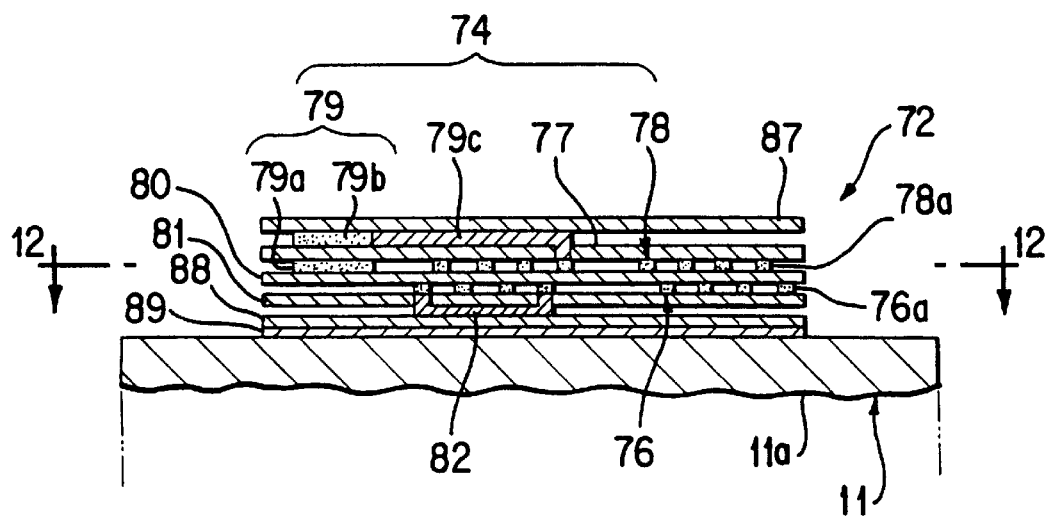
FIG. 11 is a cross-sectional view of line G—G in FIG. 12 according to a sixth embodiment of the present invention.
Figure 12:
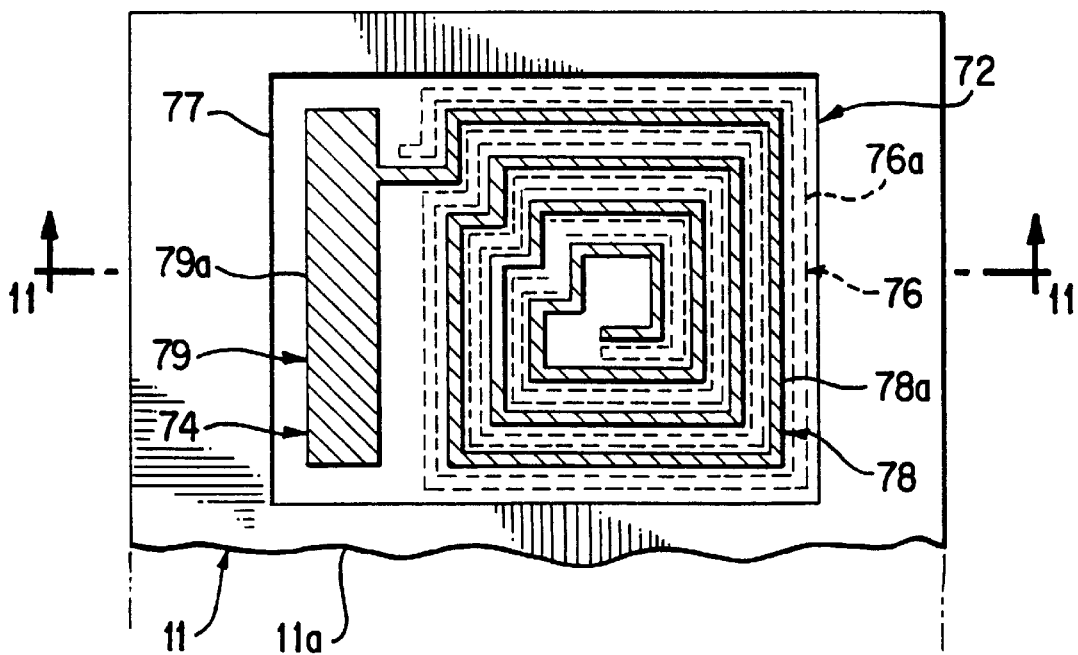
FIG. 12 is a cross-sectional view of line H—H in FIG. 11.
Figure 13:
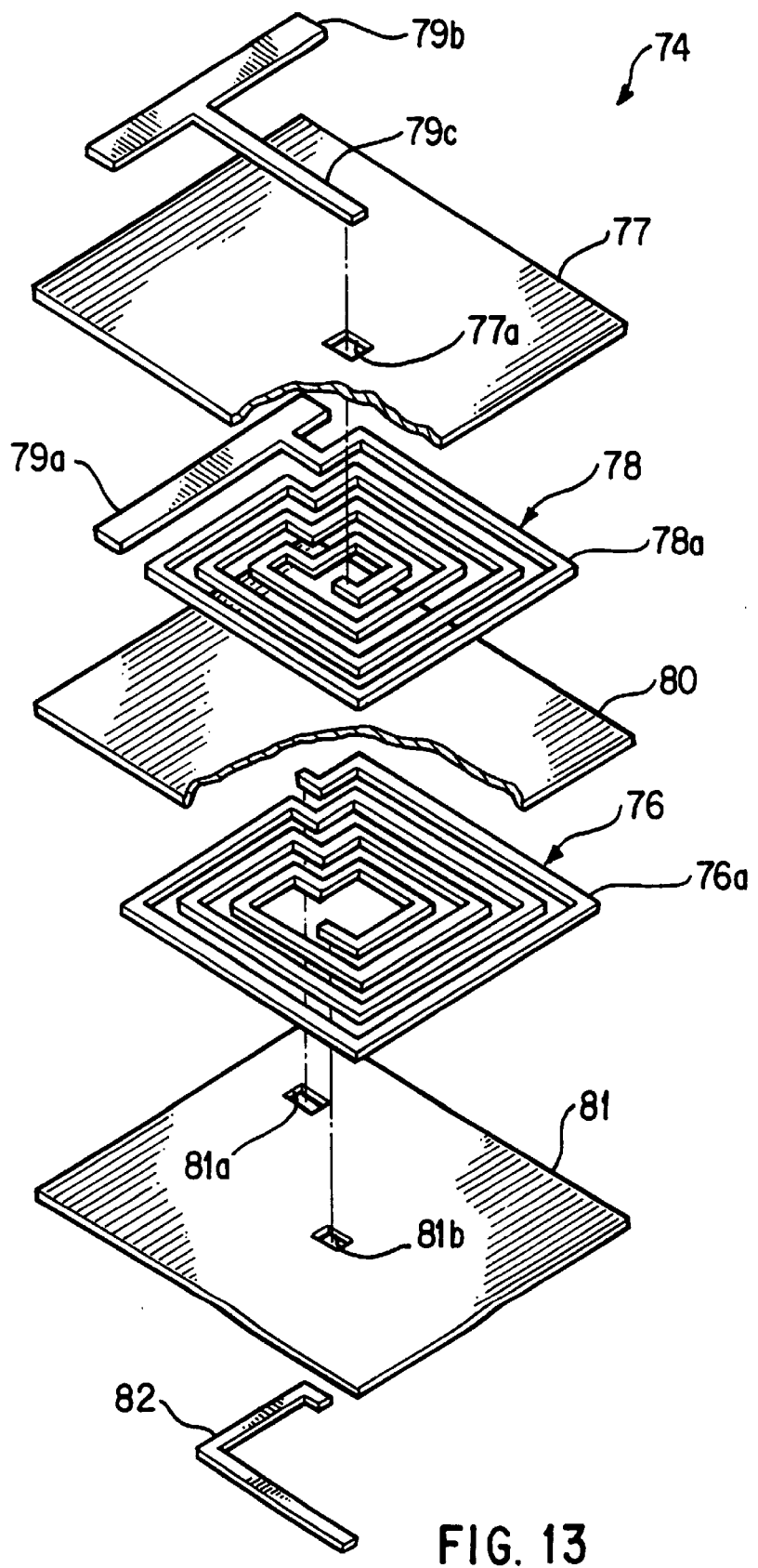
FIG. 13 is an assembly view of a resonance circuit and a shielding coil of an anti-theft tag.

As shown in FIGS. 11 and 12 and with reference to FIG. 3, a tag 72 is provided with a resonance circuit 74 which resonates radio waves of a specified frequency transmitted from an interrogator antenna 13, and a flat, spiral shielding coil 76 which is disposed between the attaching surface of the article 11 and the resonance circuit 74. As shown in FIG. 13, the resonance circuit 74 includes a dielectric layer 77 formed of an insulating material such as paper or thin plastic, a square, flat and spiral resonance coil 78 which is provided on the bottom surface of the dielectric layer 77, a first electrode layer 79a provided on the bottom surface of the dielectric layer 77 and electrically connected to the resonance coil 78, and a second electrode layer 79b provided on the upper surface of the dielectric layer 77 so as to face the first electrode layer 79a. The first electrode layer 79a, the dielectric layer 77 and the second electrode layer 79b act as a capacitor 79. The dielectric layer 77 is provided with a through-hole 77a facing the inner side of the resonance coil 78, the second electrode layer 79b is provided with a lead wire 79c of which the tip faces the through-hole 77a (shown in FIGS. 11 and 13). The resonance coil 78, the first electrode layer 79a, the second electrode layer 79b and the lead wire 79c are formed of a conductive material such as aluminum or copper. By laminating the resonance coil 78 with the first electrode 79a and the second electrode 79b with the lead wire 79c through the dielectric layer 77, the inner terminal of the resonance coil 78 is electrically connected to the tip of the lead wire 79c through the through-hole 77a (shown in FIG. 11).

The shielding coil 76 is formed into a square, flat and spiral shape using a conductive material such as aluminum or copper. It is preferred that the shielding coil 76 be larger than the resonance coil 78. As shown in FIGS. 11–12, it is further preferred that each wire segment 76a of the shielding coil 76 be provided between two adjacent wire segments 78a of the resonance coil 78 when a laminate of the resonance circuit 74 and the shielding coil 76 is projected from the top or bottom face. That is, it is preferred that the wire segments 76a of the shielding coil 76 and the wire segments 78a of the resonance coil 78 have the same pitch, and the outer segment 76a of the shielding coil 76 be slightly larger than the outer segment 78a of the resonance coil 78. The reason that the shielding coil 76 is larger than the resonance coil 78 is to ensure electromagnetic shielding between the resonance coil 78 and the article 11 by means of the shielding coil 76. The reason that each wire segment 76a of the shielding coil 76 and each wire segment 78a of the resonance coil 78 are adjacent to each other as discussed above, is to decrease the distributed capacitance between the shielding coil 76 and the resonance coil 78 and to increase the Q value.

As shown in FIGS. 11 and 13 on the bottom face of the shielding coil 76, a short-circuit wire 82 is provided through a short-circuit insulating layer 81. The short-circuit insulating layer 81 is formed of an insulating material, such as paper or a thin plastic plate, and the short-circuit wire 82 is formed of a conductive material, such as aluminum or copper. As shown in FIG. 13, the short-circuit insulating layer 81 is provided with first and second throughholes 81a and 81b at positions facing the outer and inner terminals of the shielding coil 76, respectively. Both ends of the short-circuit wire 82 are bent so as to face the first and second through-holes 81a and 81b. As shown in FIG. 11, upon laminating the shielding coil 76 and the short-circuit wire 82 through the short-circuit insulating layer 81, the inner and outer terminals of the shielding coil 76 are electrically connected to each other by the short-circuit wire 82.

As shown in FIGS. 11 and 13, a coil insulating layer 80 is disposed between the shielding coil 76 and the resonance coil 78. The coil insulating layer 80 is formed of non-magnetic and non-conductive paper or a thin plastic plate. It is preferred that the layer thickness be 5 mm or less and preferably 0.1 mm to 1 mm due to distributed capacitance between the resonance coil 78 and the shielding coil 76. Such a coil insulating layer 80 decreases a loss resistance component of the resonance circuit 74, increases the Q value and suppresses a decrease in the self-inductance of the resonance circuit 74 due to the shielding coil 76. The reason for the thickness limitation of the coil insulating layer 80, as described above is because a thicker coil insulating layer 80 further affects the Q value and self-inductance. Moreover, an excessively thick layer causes protrusion of the tag 72 from the article 11, resulting in difficult handling and appearance deterioration.

As shown in FIG. 11, a display board 87 such as a price tag for displaying the price with numerals or a bar code is stacked on the top face of the second electrode layer 79b and the lead wire 79c, and a bonding layer 89 is stacked on the bottom face of the short-circuit wire 82 through a base insulating layer 88. The display board 87 and the base insulating layer 88 are formed of an insulating material such as paper or a thin plastic plate.

In this embodiment, the resonance coil 78 and the shielding coil 76 are formed into a square, flat, spiral shape. The coils may be formed into a rectangular, circular or any other shape as long as they are flat and spiral. If the tag 72 is disposed between the display board 87 and the article 11, it is preferable that the tag 72 be square or rectangular and slightly smaller than the display board 87.

In this embodiment, the shielding coil 76 is larger than the resonance coil 78. However, the shielding coil 76 may be the same size as the resonance coil 78, so long as eddy currents do not occur in the article 11 when the resonance coil 78 resonates and the self-inductance of the resonance circuit 74 does not change.

The operation of the anti-theft tag having such a configuration is substantially the same as that depicted in FIG. 3 and discussed in the previous embodiments. Accordingly, a detailed illustration will be omitted.

A method of making an anti-theft tag having such a configuration will now be illustrated with reference to FIGS. 14a, 14b, and 14c.

Figure 14A:
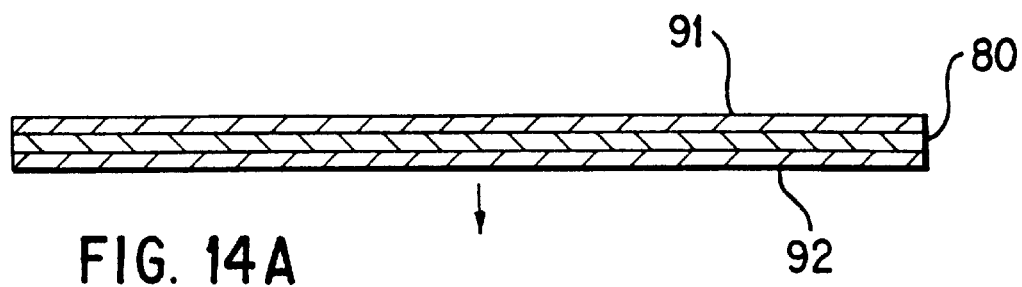
FIG. 14 is a cross-sectional view illustrating a production process of the resonance circuit and the shielding coil.
Figure 14B:
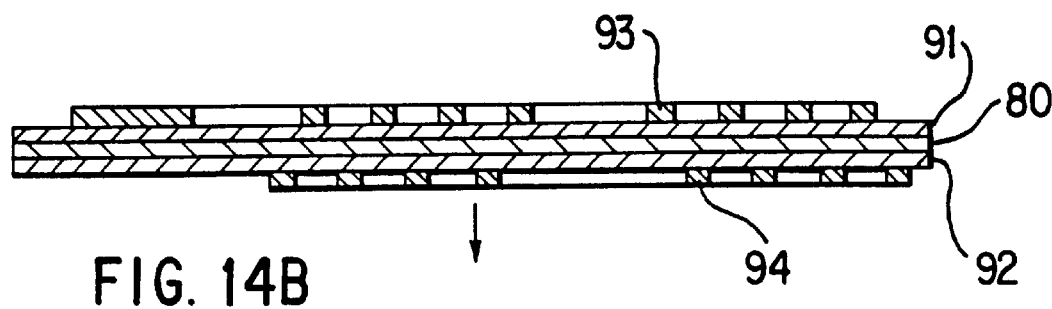
Figure 14C:
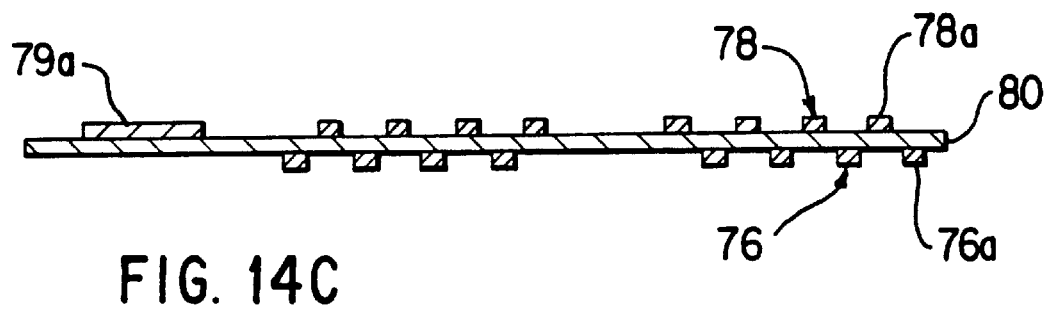
Figure 15:
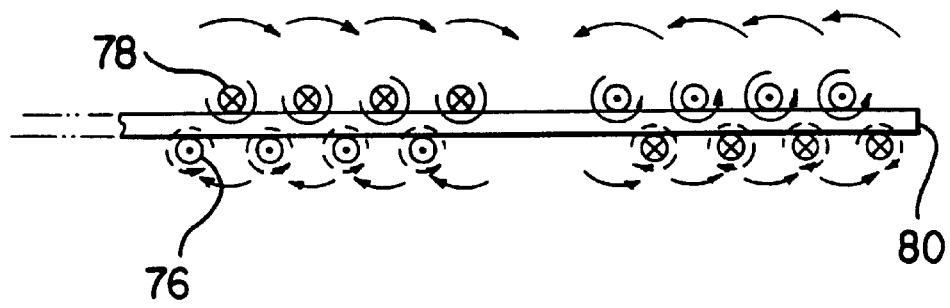
FIG. 15 is a cross-sectional view illustrating the direction of a magnetic field, which is generated when an electric current flows in the resonance coil due to radio waves of a specified frequency from an interrogator antenna and an induced current flows in the shielding coil.

As shown in FIG. 14(a), a pair of conductive foils 91 and 92 formed with, for example, aluminum or copper foil are laminated on both sides of a coil insulating layer 80. As shown in FIG. 14(b), the conductive foil 91 on the top face of the coil insulating layer 80 is covered with a resist coating film 93 of which the shape corresponds to that of the resonance coil 78 and the first electrode layer 79a (shown in FIG. 14c), and the conductive foil 92 on the bottom face of the coil insulating layer 80 is covered with a resist coating film 94 of which the shape corresponds to that of the shielding coil 76. As shown in FIG. 14(b) and (c), the sections of the conductive foils 91 and 92 which are not coated with the resist coating films 93 and 94 are removed with an etching solution, e.g. an aqueous sodium hydroxide solution for the aluminum foil, or an aqueous ferric chloride solution for the copper foil, and then the resist coating films 93 and 94 are peeled off. By such an etching process, the resonance coil 78 and the first electrode layer 79a are formed on one side of the coil insulating layer 80, and the shielding coil 76 is formed on the other side.

Referring to FIG. 11, a second electrode layer 79b and a lead wire 79c are formed on the bottom face of a display board 87 by etching and a short-circuit wire 82 is formed on the top face of the base insulating layer 88 by etching. Referring to FIG. 13, a through-hole 77a is formed at a predetermined position in a dielectric layer 77 and a first and second through-holes 81a and 81b are formed at predetermined positions, respectively, in a short-circuit insulating layer 81. Then, a bonding agent (not shown) is applied to both sides of the dielectric layer 77 and the short-circuit insulating layer 81.

Referring to FIG. 11, a cover board 87 provided with a second electrode layer 79b and a lead wire 79c, the dielectric layer 77, the coil insulating layer 80 provided with the resonance coil 78, the first electrode layer 79a and shielding coil 76, the short-circuit insulating layer 81, a base insulating layer 88 with a lead wire 82, and a bonding layer 89 are stacked in that order and laminated under a given pressure. Because this method can efficiently make a tag 72 and enables an accurate alignment between the resonance coil 78 and the shielding coil 76, the resonance characteristics of the tag 72 can be stabilized.

The resonance coil 78 and shielding coil 76 each having a flat, spiral shape may be formed by coiling an insulated wire or by punching a conductive sheet, e.g. aluminum foil or copper foil.

Operation of the anti-theft tag having the configuration described above will now be explained.

Referring to FIG. 3, when the article 11 with the anti-theft tag 72 (shown in FIG. 11) is illegally passed between the interrogator antenna 13 and the transponder antenna 23, the resonance circuit 74 of the tag 72 resonates in response to the radio waves transmitted from the interrogator antenna 13, and an alternating current flows in the resonance coil 78. The current flow generates a resonance magnetic field as shown with solid arrows in FIG. 15 around the resonance coil 78. An induced current flows in the shielding coil 76 in the reverse direction to the resonance coil 78 and generates a shielding magnetic field as shown with broken arrows in FIG. 15 around the shielding coil 76. The resonance magnetic field and the shielding magnetic field are reverse to each other on the surface of the article 11 and therefore offset each other. Thus, no eddy currents occur on the surface of the article 11, and the self-inductance of the resonance circuit 74 does not substantially change compared with a tag attached to an article with an insulating or nonmagnetic surface. As a result, the resonance circuit 74 emits radio waves with a frequency which is determined by the self-inductance of the resonance coil 78 and the capacitance of the capacitor 79. When the transponder antenna 23 receives these radio waves, the controller 24 detects that the article 11 has been taken illegally and generates an alarm via the speaker 26.

As shown in FIG. 14, each wire segment 76a of the shielding coil 76 is provided between two adjacent wire segments 78a of the resonance coil 78 when a laminate of the resonance circuit 74 and the shielding coil 78 is projected from the top or bottom face, and a nonconductive nonmagnetic coil insulating layer 80 of a given thickness is disposed between the shielding coil 76 and the resonance coil 78, as described above. Thus, the distributed capacitance between the resonance coil 78 and the shielding coil 76 is decreased even if high frequency radio waves are transmitted from the interrogator antenna 13 (i.e., the resonance frequency of the resonance circuit 74 is high). As a result, eddy currents occurring on the surface of the article 11 can be further reduced and the Q value increased, resulting in a narrower resonance frequency band and a sharp resonance of the resonance circuit 74.

Accordingly, the resonance circuit 74 of the tag 72 resonates only radio waves having a specified wavelength transmitted from the interrogator antenna 13, and does not resonate radio waves of a slightly different wavelength transmitted from any other source, and hence, false alarms can be prevented. When the article 11 is brought to a check-out counter (not shown) for payment, the capacitor 79 of the resonance circuit 74 is broken and short-circuited by, for example, emitting strong radio waves to the tag 72 or by heating it. As a result, the resonance circuit 74 does not resonate when the article 11 is passed between the interrogator antenna 13 and the transponder antenna 23.

Although self-inductance of the resonance coil decreases by using the shielding coil 76, a resonance coil which responds to the resonance frequency when not using the shielding coil 76, can be prepared by increasing the turns of the resonance coil or the capacitance of the capacitor.

Seventh Embodiment

Figure 16:
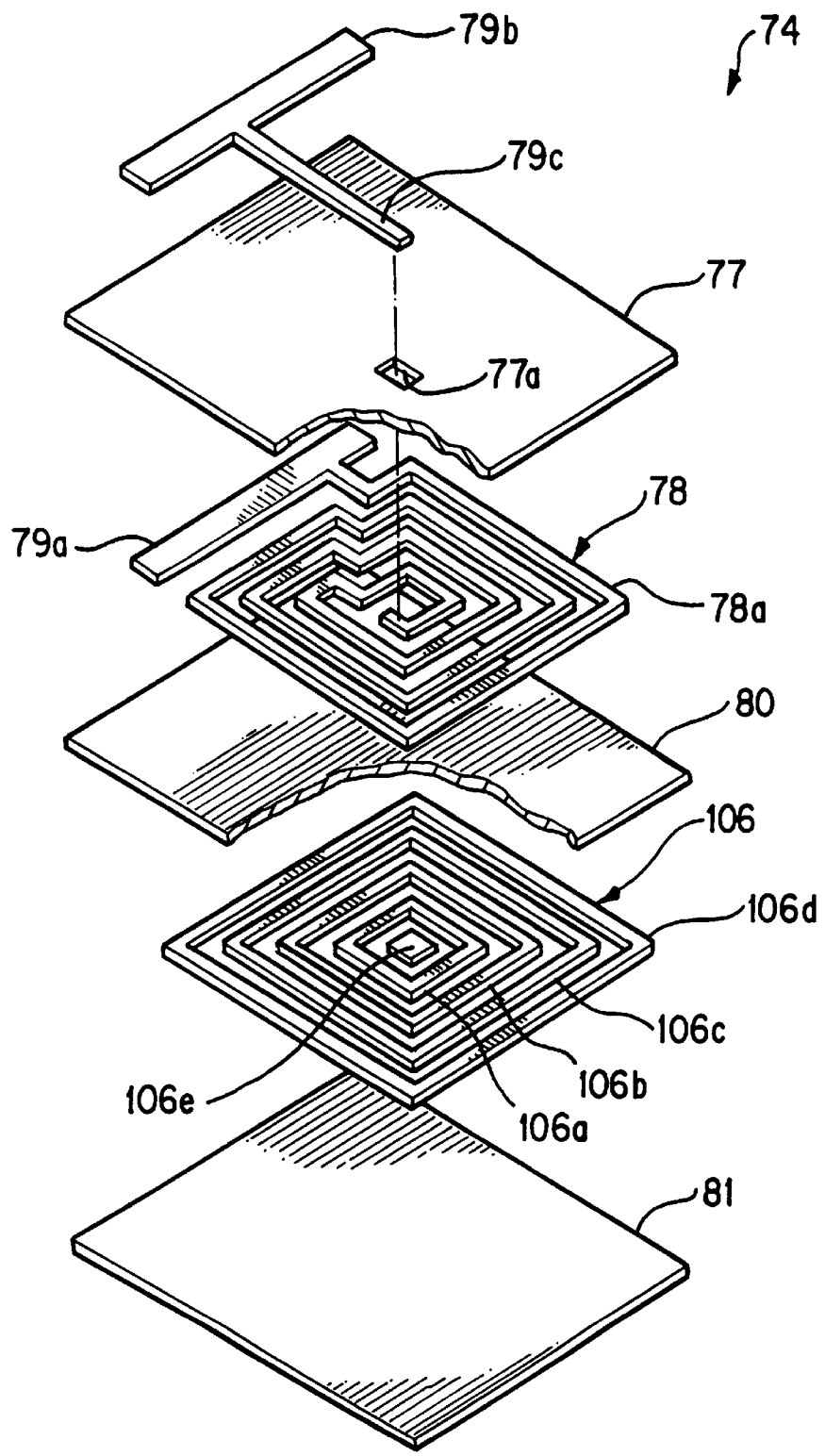
FIG. 16 is an assembly view, corresponding to FIG. 13, according to a seventh embodiment of the present invention.

FIG. 16 shows a seventh embodiment according to the present invention. In this embodiment, the anti-theft tag has a similar configuration as in the above-mentioned sixth embodiment, except that a shielding coil 106 consist of a plurality of square first to fourth ring sections 106a–106d having different sizes which are concentrically disposed and a square center section 106e. It is preferable that the square center section 106e be disposed in the center of a resonance coil 78, and the first to fourth ring sections 106a–106d be disposed almost between wire segments 78a of the resonance coil 78. The square center section 106e is regarded as a ring having an inner diameter of zero in which the square periphery has a function as a shielding coil.

Since the shielding coil 106 consists of simple rings having only one turn in such an anti-theft tag, it can be produced by a more simplified etching process compared to the spiral shielding coil in the above-mentioned sixth embodiment. Each ring section is not limited to a square shape, and may be a rectangular or circular shape or the like. The number of turns is also not limited.

EXAMPLES

The present invention will now be illustrated in detail with reference to several examples along with a comparative example.

Example 1

With reference to FIGS. 1 and 2, a base board 17 having a length of 40 mm, a width of 40 mm and a thickness of 0.1 mm was made of paper as an insulation material for a resonance circuit 14 of the tag 12 attached to an article 11. A rectangular coil 18 which was formed by spirally coiling 9 times an insulated wire with a diameter of 0.2 mm was bonded to a side of the base board 17. The length of the coil 18 was 30 mm on the outer side and 10 mm on the inner side. The capacitor 19 was not connected to both ends of the coil 18 because the resonant frequency of the resonance circuit 14 changes due to a change in the self-inductance of the coil 18 when the material of the article 11 changes and because the capacitance of the capacitor 19 does not change with the material of the article 11. A soft magnetic layer 16 was bonded to one side of the base board 17 such that the coil 18 was disposed between them. The soft magnetic layer 16 included an alloy of 80 percent by weight of Co, 10 percent by weight of Fe, 6 percent by weight of Si and 4 percent by weight of B and was shaped to be 40 mm long, 40 mm wide and 25 μm thick to form a tag 12 of Example 1.

Example 2

A tag of Example 2 was prepared as in Example 1, but the soft magnetic layer included a composite material of cobalt amorphous alloy flakes and an acrylic resin and was shaped to be 40 mm long, 40 mm wide and 0.6 mm thick. The cobalt amorphous alloy included 80 percent by weight of Co, 10 percent by weight of Fe, 6 percent by weight of Si and 4 percent by weight of B. Flakes of this alloy had a diameter in a range of 0.05 mm to 0.5 mm and thicknesses in a range of 5 μm to 50 μm.

Example 3

A tag was prepared as in Example 1, but the soft magnetic layer was shaped to be 40 mm long, 40 mm wide and 0.05 mm thick using a PERMALLOY (i.e., JIS PC TYPE 1).

Example 4

With reference to FIGS. 4 to 7, a base board 17 have a length of 40 mm, a width of 40 mm and a thickness of 0.1 mm was made of paper as a non-conductive non-magnetic material. A square, flat, spiral coil 18 (formed by coiling nine turns a surface-insulated lead wire having a diameter of 0.2 mm) was bonded to a face of the base board 17. The length of the coil 18 was 30 mm on the outer side and 10 mm on the inner side. A capacitor 19 shown in FIG. 5 was not connected to both terminals of the resonance coil 18, for the same reason as in Example 1.

A soft magnetic layer 36 was bonded to the base board 17 such that the coil 18 was disposed between the soft magnetic layer 36 and the base board 17. The soft magnetic layer 36 included of a first layer 36a, a second layer 36b, a third layer (not shown) and a fourth layer (not shown). The first and second layers were composed of an alloy including 80 percent by weight of Co, 10 percent by weight of Fe, 6 percent by weight of Si and 4 percent by weight of B, and were shaped to be 40 mm long, 40 mm wide and 25 μm thick. The first layer 36a was provided with a plurality of first slits 36c at a given interval in the vertical direction except for a rectangular center 36e along the transverse direction. The second layer 36b was provided with a plurality of second slits 36d at a given interval in the transverse direction except for a rectangular center 36f along the vertical direction. The third layer was provided with a plurality of third slits (not shown) similar to the first slits 36c, and the fourth layer was provided with a plurality of fourth slits (not shown) similar to the second slits 36d. Widths and intervals between the first to fourth slits were the same as each other, although directions of these slits are different from each other. These slits had a width of 0.15 mm and a length of 35 mm and an interval of 0.85 mm. The width of the rectangular non-slit center was 2 mm. Each of the first layer 36a and the third layer had seventy-eight vertical slits 36c in total (39 slits each for the upper and lower sides), and each of the second layer 36b and the fourth layer had seventy-eight vertical slits 36d in total (39 slits each for the right and left sides). The first to fourth layers were bonded to each other through bonding layers 20 providing mutual electrical insulation from each other to form a tag 32 of Example 4.

Example 5

With reference to FIGS. 11 to 13, a planar coil insulating layer 80, 40 mm long, 40 mm wide and 0.1 mm thick was made of paper as a non-conductive non-magnetic material. A square, flat, spiral resonance coil 78, which was formed by coiling nine turns a surface-insulated lead wire having a diameter of 0.2 mm, was bonded to the upper face of the coil insulating layer 80. The resonance coil 78 had an outer side length of 30 mm and an inner side length of 10 mm. A capacitor 79 shown in FIGS. 11 to 13 was not connected to both terminals of the resonance coil 78 for the same reason as in Example 1. A square, flat, spiral shielding coil 76, which was formed by coiling nine turns the lead wire described above, was bonded to the lower face of the coil insulating layer 80, and both terminals of the shielding coil 76 were short-circuited with a short-circuit wire 82. A short-circuit insulating layer 81 was disposed between the shielding coil 76 and the short-circuit wire 82. A display board 87, a base insulating layer 88 and a bonding layer 89 as shown in FIG. 11 were not laminated The resulting tag 72 was referred to as Example 5.

Example 6

A tag 72 was formed as in Example 5, except that an acrylic sheet of 0.95 mm thickness was used as the coil insulating layer 80 shown in FIGS. 11 to 13.

Example 7

A tag was formed as in Example 4 except that no slit was formed in the first to fourth soft magnetic layers (not shown).

Comparative Example 1

A tag was formed as in Example 1 except that no soft magnetic layer was provided.

Comparative Example 2

A tag without a shielding coil was formed as in Example 5.

Comparison Test 1 and Evaluation

Tags of Examples 1 to 3 and Comparative Example 1 were placed on an acrylic board of 1 mm thickness, an aluminum board of 1 mm thickness and a steel sheet of 1 mm thickness. The self-inductance of the resonance coil of each tag were measured by a RF impedance analyzer 4191A (made by Yokogawa Hewlett-Packard) while changing the frequency. The results are shown in Table 1.

Table 1 demonstrates that the tag of Comparative Example 1 has higher self-inductances for the radio wave frequencies when placed on the acrylic board than when placed on the aluminum board. In contrast, the self-inductances of tags of Examples 1 to 3 barely change for the acrylic board, aluminum board and steel sheet at each given frequency. Thus, the tags of Examples 1 to 3 have almost the same resonance frequency for radio waves of a given frequency, even when they are attached to an article made of any material.

Comparison Test 2 and Evaluation

Tags of Example 4 and Example 7 were placed on an acrylic board of 1 mm thickness, an aluminum board of 1 mm thickness and a steel sheet of 1 mm thickness. The coil of each tag was connected to a RF impedance analyzer HP 4191A (made by Yokogawa Hewlett-Packard) and the self-inductance L and the Q value of the coil was measured while changing the frequency. The Q value is defined by $\mu L/r$ wherein $\mu$ represents angular frequency and r represents the resistance component of the resonance circuit. It is known that the resonance width is narrowed with a higher Q value since the loss due to eddy currents is reduced. The Q value can be directly read from the RF impedance analyzer set forth above. The results are shown in Table 2.

Table 2 demonstrates that the tags of Example 4 and Example 7 have substantially the same self-inductances for the radio wave frequencies when placed on the acrylic board than when placed on the aluminum board, and the Q value of the tag of Example 4 is significantly higher than that of the tag of Example 7. The results show that the tag of Example 4 has a lower loss due to eddy currents and a sharper resonance width compared with the tag of Example 7.

Comparison Test 3 and Evaluation

Tags of Examples 5 and 6 and Comparative Example 2 were placed on an acrylic board of 1 mm thickness, an aluminum board of 1 mm thickness and a steel sheet of 1 mm thickness. The self-inductance L and the Q value of the resonance coil of each tag were measured by a RF impedance analyzer 4191A (made by Yokogawa Hewlett-Packard) while changing the frequency. The results are shown in Table 3.

Table 3 demonstrates that the tag of Comparative Example 2 has different self-inductances at each given frequency when placed on the acrylic board, aluminum board and steel sheet. In contrast, the self-inductances of the resonance coil of each tag of Examples 5 and 6 barely change for the acrylic board, aluminum board and steel sheet at each given frequency.

The Q values of the tags of Examples 5 and 6 on the acrylic board are lower than that of Comparative Example 2, whereas the Q values of the tags of Examples 5 and 6 on the aluminum board and steel sheet are significantly higher than those of Comparative Example 2. The Q values of Example 6 further increase compared with Example 5. These results suggest that tags of Examples 5 and 6 have low loss resistance components due to eddy currents and sharp resonance widths.

TABLE 1

| Measuring Frequency (MHZ) | Self-inductances ($\mu$H) of a resonance circuit when a surface material of an article for attaching a tag is changed | | | The ratio of the self-inductances of the resonance circuit of tags attached to different articles | |
|---|---|---|---|---|---|
| | Acryle board (AC) | Aluminum board (Al) | Steel sheet (Fe) | Al/AC | Fe/AC |
| Example 1 | | | | | |
| 1 | 3.731 | 3.646 | 3.147 | 0.9772 | 0.8435 |
| 2 | 3.407 | 3.300 | 2.885 | 0.9686 | 0.8468 |
| 4 | 2.943 | 2.863 | 2.581 | 0.9728 | 0.8770 |
| 10 | 2.159 | 2.135 | 2.149 | 0.9889 | 0.9954 |
| 12 | 1.984 | 1.966 | 2.066 | 0.9909 | 1.0412 |
| 15 | 1.748 | 1.732 | 1.954 | 0.9903 | 1.118 |
| 20 | 1.366 | 1.340 | 1.731 | 0.9810 | 1.267 |
| Example 2 | | | | | |
| 1 | 4.126 | 4.003 | 4.074 | 0.9802 | 0.9874 |
| 2 | 4.095 | 3.965 | 4.028 | 0.9683 | 0.9836 |
| 4 | 4.114 | 3.990 | 4.044 | 0.9699 | 0.9830 |
| 10 | 4.695 | 4.635 | 4.687 | 0.9872 | 0.9983 |
| 12 | 5.134 | 5.140 | 5.188 | 1.0012 | 1.0102 |
| 15 | 6.200 | 6.380 | 6.420 | 1.0290 | 1.0355 |
| 20 | 10.16 | 8.440 | 8.100 | 0.8307 | 0.7972 |
| Example 3 | | | | | |
| 1 | 3.265 | 3.372 | 2.750 | 1.0329 | 0.8422 |
| 2 | 3.122 | 2.883 | 2.560 | 0.9232 | 0.8198 |
| 4 | 2.509 | 2.526 | 2.211 | 1.0068 | 0.8814 |
| 10 | 1.944 | 1.951 | 1.934 | 1.0036 | 0.9947 |
| 12 | 1.792 | 1.717 | 1.838 | 0.9579 | 1.0257 |
| 15 | 1.570 | 1.510 | 1.784 | 0.9761 | 1.1534 |
| 20 | 1.216 | 1.144 | 1.483 | 0.9408 | 1.2198 |
| Comparative 1 | | | | | |
| 1 | 2.439 | 0.5601 | 1.181 | 0.2296 | 0.4842 |
| 2 | 2.442 | 0.5356 | 0.985 | 0.2193 | 0.4034 |
| 4 | 2.454 | 0.5147 | 0.8361 | 0.2097 | 0.3401 |
| 10 | 2.640 | 0.4996 | 0.7070 | 0.1892 | 0.2678 |
| 12 | 2.754 | 0.5004 | 0.9621 | 0.1817 | 0.3493 |
| 15 | 2.998 | 0.5043 | 0.6807 | 0.1682 | 0.2271 |
| 20 | 3.717 | 0.5180 | 0.6806 | 0.1394 | 0.1831 |

TABLE 2

| Measuring Frequency (MHZ) | Self-inductances ($\mu$H) of a resonance circuit when a surface material of an article for attaching tag is changed | | | Q value of resonance circuits when a surface material of an article for attaching a tag is changed | | |
|---|---|---|---|---|---|---|
| | Acryle board | Aluminum board | Steel sheet | Acryle board | Aluminum board | Steel Sheet |
| Example 4 | | | | | | |
| 1 | 4.13 | 4.00 | 4.07 | 19.50 | 17.9 | 15.45 |
| 2 | 4.10 | 3.97 | 4.03 | 17.70 | 16.57 | 14.90 |
| 4 | 4.11 | 3.99 | 4.04 | 13.88 | 12.71 | 11.60 |
| 10 | 4.70 | 4.64 | 4.69 | 7.56 | 6.40 | 5.93 |
| 12 | 5.13 | 5.14 | 5.19 | 6.18 | 5.10 | 4.76 |
| 15 | 6.20 | 6.38 | 6.42 | 4.28 | 3.24 | 3.08 |
| 20 | 10.16 | 8.44 | 8.10 | 1.60 | 0.79 | 0.72 |
| Example 7 | | | | | | |
| 1 | 3.79 | 3.75 | 3.36 | 4.71 | 4.92 | 4.55 |
| 2 | 3.43 | 3.40 | 3.04 | 3.43 | 3.50 | 3.60 |
| 4 | 2.94 | 2.93 | 2.66 | 2.41 | 2.45 | 2.77 |

TABLE 2-continued

| Measuring Frequency (MHZ) | Self-inductances (μH) of a resonance circuit when a surface material of an article for attaching tag is changed | | | Q value of resonance circuits when a surface material of an article for attaching a tag is changed | | |
|---|---|---|---|---|---|---|
| | Acryle board | Aluminum board | Steel sheet | Acryle board | Aluminum board | Steel Sheet |
| 10 | 2.16 | 2.18 | 2.16 | 1.43 | 1.45 | 1.79 |
| 12 | 1.99 | 2.01 | 2.06 | 1.25 | 1.27 | 1.59 |
| 15 | 1.76 | 1.78 | 1.92 | 1.03 | 1.03 | 1.32 |
| 20 | 1.30 | 1.37 | 1.67 | 0.72 | 0.72 | 0.92 |

TABLE 3

| Measuring Frequency (MHZ) | Self-inductances (μH) of a resonance circuit when a surface material of an article for attaching tag is changed | | | Q value of resonance circuits when a surface material of an article for attaching a tag is changed | | |
|---|---|---|---|---|---|---|
| | Acryle board | Aluminum board | Steel sheet | Acryle board | Aluminum board | Steel Sheet |
| Example 5 | | | | | | |
| 10 | 1.36 | 1.33 | 1.35 | 17.50 | 16.9 | 14.7 |
| 12 | 1.36 | 1.33 | 1.35 | 21.0 | 20.3 | 17.7 |
| 15 | 1.36 | 1.33 | 1.35 | 26.2 | 25.3 | 22.1 |
| 20 | 1.31 | 1.33 | 1.35 | 34.9 | 33.8 | 29.5 |
| Example 6 | | | | | | |
| 10 | 1.54 | 1.50 | 1.51 | 20.7 | 19.0 | 16.4 |
| 12 | 1.54 | 1.50 | 1.51 | 24.9 | 22.8 | 19.7 |
| 15 | 1.54 | 1.50 | 1.51 | 31.1 | 28.5 | 24.6 |
| 20 | 1.54 | 1.50 | 1.51 | 41.4 | 38.0 | 32.8 |
| Comparative 2 | | | | | | |
| 10 | 2.64 | 0.35 | 0.82 | 71 | 6.96 | 1.80 |
| 12 | 2.76 | 0.35 | 0.78 | 75 | 8.10 | 1.79 |
| 15 | 3.01 | 0.35 | 0.75 | 70 | 7.40 | 1.76 |
| 20 | 3.77 | 0.34 | 0.72 | 49 | 7.10 | 1.67 |

In summary and as set forth above, since the anti-theft tag in accordance with the present invention attached to a theft-monitored article includes a resonance circuit which resonates radio waves of a specified frequency transmitted from the interrogator antenna and a soft magnetic layer disposed between the attaching face of the article and the resonance circuit, the resonance circuit is electromagnetically shielded from the article having a surface formed of a conductive or ferromagnetic material by means of the soft magnetic layer, and thus the self-inductance of the resonance circuit does not substantially change. In other words, the resonance frequency of the resonance circuit attached to the article is almost the same as that attached to an article of which the surface is made of an insulating or nonmagnetic material.

Further, at least one slit formed in the soft magnetic layer causes essentially no change in the self-inductance of the resonance circuit even when the resonance frequency is high, because eddy currents occurring in the soft magnetic layer are shielded by the use of slits. When the soft magnetic layer is a composite material of soft magnetic material flakes and a plastic, eddy currents in the soft magnetic layer can be suppressed even if the frequency of radio waves transmitted from the interrogatory antenna is high. Thus, the self-inductance of the resonance circuit does not substantially change. In other words, the resonance frequency of the resonance circuit which is attached to an article having a surface of a conductive or ferromagnetic material is almost the same as that attached to an article having a surface of a insulation or non-magnetic material. When the soft magnetic material which forms the soft magnetic layer is any one of an amorphous alloy, PERMALLOY, electromagnetic soft iron, silicon steel sheet, sendust alloy, Fe—Al alloy, and soft magnetic ferrite, the resonance circuit is electromagnetically shielded from an article having a surface of a conductive or ferromagnetic material, because these soft magnetic materials have high permeabilities, small coercive forces and small hysteresis losses.

When a flat shielding coil, which is short-circuited at both ends, is disposed between the attaching face of the article and the resonance circuit, a magnetic field occurring on the surface of the article by resonance of the resonance circuit, is offset by a magnetic field occurring by the reverse induced current flowing in the shielding coil, even if the resonance circuit resonates on an article having a surface of conductive material such as aluminum or ferromagnetic material. As a result, no eddy currents occur on the article surface and the resonance circuit has almost the same self-inductance as when the tag is attached to an article having an insulating or non-magnetic surface. When the size of the shielding coil is the same or larger than the resonance coil of the resonance circuit, the resonance coil is completely shielded from the article by means of the shielding coil. Thus, no eddy currents occur on the article, even if the resonance coil resonates and the self-inductance of the resonance circuit does not substantially change.

When each wire segment or ring section of the shielding coil is provided between two adjacent wire segments of the resonance coil when a laminate of the resonance circuit and the shielding coil is projected from the top or bottom face, the distributed capacitance between the resonance coil and the shielding coil decreases, and thus eddy currents on the article surface can be reduced. As a result, the loss resistance component of the resonance circuit can be decreased, or the Q value can be increased. Thus, the resonance frequency band of the resonance circuit can be narrowed and the resonance circuit exhibit a sharp resonance. The decrease in the loss resistance component due to hysteresis of the resonance circuit and the increase in the Q value can be achieved even at a higher resonance frequency.

When a non-conductive non-magnetic coil insulating layer having a thickness of 5 mm or less is disposed between the shielding coil and the resonance coil, the distributed capacitance between the resonance coil and the shielding coil can be further reduced. Thus, eddy current occurring on the article surface can be further reduced, the Q value further increased, and the resonance circuit has a sharper resonance.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An anti-theft tag for attachment to a theft-monitored article, comprising:

a resonance circuit which resonates radio waves of a predetermined frequency transmitted from an antenna; and a shielding coil having at least two terminals, wherein said shielding coil is disposed between said resonance circuit and said article when said anti-theft tag is attached to said article, and wherein said at least two terminals are short-circuited.

2. An anti-theft tag in accordance with claim 1, wherein:

said resonance circuit comprises a resonance coil; and said shielding coil has a size which is at least equal to or greater than a size of said resonance coil.

3. An anti-theft tag for attachment to a theft-monitored article, comprising:

a resonance circuit which resonates radio waves of a predetermined frequency transmitted from an antenna; and a shielding coil disposed between said resonance circuit and said article when said anti-theft tag is attached to said article, wherein said resonance circuit comprises a resonance coil having a plurality of first segments creating a first ring section; and said shielding coil comprises a plurality of second segments creating a second ring section, wherein said plurality of second segments of said shielding coil are disposed between said plurality of first segments of said resonance coil.

4. An anti-theft tag in accordance with claim 3, further comprising:

an insulating layer disposed between said first ring section of said resonance coil and said second ring section of said shielding coil.

* * * * *